Patented Dec. 26, 1944

2,365,966

UNITED STATES PATENT OFFICE 2,365,966

PRODUCTION OF INDOLE

John E. Livak, Midland, Mich., assignor to The Dow Chemical Company, Midland, Mich., a corporation of Michigan No Drawing. Application March 3, 1941, Serial No. 381,541

20 Claims. (Cl. 260—319)

This invention concerns an improved method for the manufacture of indole.

In German Patent No. 260,327 it is disclosed that indole may be formed by heating an aqueous solution of indoxyl and an alkali metal hydroxide in an autoclave to a temperature above 200° C. The patent indicates that alkaline earth metal hydroxides may, if desired, also be present in the mixture, but it does not teach the presence of alkaline earth metal hydroxides to be necessary, or even desirable, nor does it indicate the proportion, if any, of such hydroxide to be used. In the example of the patent aqueous indoxyl solutions which contain alkali metal hydroxides, but not alkaline earth metal hydroxides, are heated under pressure to 240° C. The patent does not give the yields of indole actually obtained, but it does indicate that by the procedure of the example indole may be produced in 20 per cent of the theoretical yield.

I have tested the method of said German Patent No. 260,327 and have found that the yield of indole obtainable by operating in accordance with the example thereof is very low, i. e. less than 2 per cent of theoretical. However, I have found that by carrying the reaction out under certain conditions not described in the patent, indole may be produced economically and in good yield. The yield of indole is dependent upon control of certain operating conditions not dealt with in the patent.

More particularly, I have found that indole may be produced in satisfactory yields by heating an aqueous solution of indoxyl and an alkali metal hydroxide only when the reaction mixture also contains certain other metal compounds in certain proportions. I have also found that, although the reaction to form indole may be carried out at the temperature of 240° C. which is given in the example of the German Patent No. 260,-327, or even at somewhat lower temperatures, it occurs more favorably when carried out at temperatures between 250° and 325° C., particularly between 260° and 280° C.

The metal compounds which I have found to have the property of strongly promoting the reaction of indoxyl to form indole are the ionizable compounds of the metals of groups II and IV, series 3–8, and of groups VI, VII, and VIII, series 4, of Mendelejeff's Periodic Table of the elements. It is desired to point out that the expression "ionizable compounds" is restrictive to compounds which are capable of entering into ionic reactions, e. g. neutralization or double decomposition reactions, but that it is not restrictive to compounds which are soluble in water. Many of the ionizable metal compounds, e. g. ferric hydroxide and stannic oxide, which I have found to be effective in promoting the formation of indole are usually considered to be water-insoluble.

The ionizable compounds of the above-mentioned metals appear to catalyze the reaction of indoxyl in the presence of alkali metal hydroxides to form indole and for convenience they will hereinafter be referred to as catalysts. However, they possess certain characteristics which are unusual in catalysts. In order to be satisfactorily effective in promoting the formation of indole they must be used in substantial proportions which are larger than the proportions of catalysts required for most other catalytic reactions. Also, these catalysts are most effective only when used in certain limited proportions. It appears probable that the catalytically active metal compounds combine chemically with the indoxyl reactant to form a compound which is readily decomposed, e. g. by auto-oxidation and reduction, to form indole and that they remain chemically combined with products of the reaction, but the invention is not restricted to this theory.

Among the catalytically active metal compounds which may be used in practicing the invention are the oxides, hydroxides, nitrates, chlorides, sulphates, acetates, etc., of magnesium, calcium, zinc, strontium, cadmium, barium, titanium, germanium, zirconium, tin, chromium, manganese, iron, and nickel. It is possible that when a salt of one of these metals is used, it is first converted to the corresponding metal hydroxide or alkali metal metalate (containing the catalytically active metal in the negative radical) and that the metal hydroxide or metalate serves as the actual catalyst, since, as hereinbefore mentioned, the reaction to form indole is carried out under alkaline conditions in the presence of an alkali metal base. However, the catalytic reaction to form indole is not fully understood and the invention is not restricted to this theoretical suggestion as to the mechanism of the reaction.

The compounds of the different metals vary in catalytic activity. Compounds of calcium, tin, and iron are preferred, since they are highly effective and are readily available at low cost. Cobalt compounds are among the least effective of the catalysts. Among those catalysts which are compounds of metals capable of having more than one valence, the compounds which contain the metal in its lower valence are usually more effective catalysts than corresponding compounds wherein the metal is of higher valence. For instance, ferrous compounds are more effective than corresponding ferric compounds and stannous compounds are more effective than corresponding stannic compounds in promoting the reaction to form indole.

The reaction mixture is prepared so as to contain indoxyl, sufficient water and alkali metal base to dissolve the indoxyl and render the solution alkaline, and the metal-containing catalyst in amount such as to contain at least 0.25, usually between 0.25 and 5, and preferably between 0.5 and 3, gram atomic weights of the metal per gram molecular weight of indoxyl in the mixture. When, as in most instances, the catalyst is a compound containing only one atom of metal in the molecule, between 0.25 and 5, preferably between 0.5 and 3, molecular equivalents of the catalyst is used per mole of indoxyl. If the catalytically active metal compound is employed in proportions lower than those just specified, it has little or no effect in promoting the formation of indole. Employment of the catalyst in proportions greater than those just recommended not only is wasteful, but usually results in a decrease in the yield of indole.

It may be mentioned that the indoxyl-containing melt which is obtained as an intermediate product in the manufacture of indigo usually contains the indoxyl and one or more alkali metal hydroxides in proportions which are satisfactory for the present reaction. Such melt may be dissolved in water and the solution be treated with a catalytically active metal compound in the proportion above-specified to obtain a reaction mixture suitable for the production of indole. The proportion of water in the mixture is of little consequence, but for convenience the water is usually employed in amount not greatly exceeding that required to dissolve the indoxyl and caustic alkali.

The reaction is carried out by heating the mixture, preferably with stirring, under pressure, e. g. in a bomb or autoclave, at temperatures between 250° and 325° C., preferably between 260° and 280° C. If desired, the reaction may be carried out continuously, e. g. by passing the mixture under pressure through a heated tubular autoclave. The reactor is advantageously nearly filled or is otherwise freed of air prior to the reaction, since the presence of a substantial amount of air or oxygen may result in oxidation of some of the indoxyl with resultant lowering of the yield. The time of heating varies from a few minutes to an hour or longer, depending on the reaction temperature employed. When operating at 250° C., the reaction may be completed in from 1 to 2 hours and considerably longer heating, e. g. for as much as 6 hours, is usually not detrimental. When operating at 300° C. the reaction may usually be completed in 20 minutes or less and longer heating is undesirable, since it may result in decomposition of the product with resultant lowering of the yield.

After completing the heating operation, the reactor is, of course, cooled and opened or otherwise discharged. The indole product is preferably steam distilled from the reaction mixture, but it may be separated in other ways, e. g. by extraction with an organic solvent such as benzene, toluene, or diethyl ether, etc.

By operating as just described, indole may readily be produced in yields of between 20 and 50 per cent of theoretical, based on the indoxyl employed.

In place of indoxyl, certain simple derivatives thereof, such as indoxylic acid and its lower alkyl esters, which are readily decomposed by heat to form indoxyl may be employed. In such instances, the indoxyl derivative is apparently first decomposed to indoxyl which then reacts to form the indole.

The following table describes a number of ways in which the principle of the invention has been employed and illustrates certain of its advantages. In each experiment of the table, a mixture of the ingredients named in the amounts given was heated in an autoclave to the temperature and for the time given. The reactor was then cooled, opened and the indole product was steam distilled from the mixture. The table gives the per cent yield of indole, based on the indoxyl employed in each experiment.

| Run No. | Starting materials | | | | | | Reaction conditions | | | Per cent yield of indole |
|---|---|---|---|---|---|---|---|---|---|---|
| | Reactant | | Alkalies | | Catalyst | | $H_2O$ moles | Temp., °C. | Time, minutes | |
| | Kind | Moles | NaOH moles | KOH moles | Kind | Moles | | | | |
| 1 | Indoxyl | 1 | 15.3 | 1.3 | None | | 263 | 240 | 120 | Less than 1.0 |
| 2 | do | 1 | 24.6 | None | do | | 410 | 250 | 60 | 0.55 |
| 3 | do | 1 | 15.6 | 1.4 | do | | 218 | 260 | 60 | Less than 1.0 |
| 4 | do | 1 | 14.3 | 1.4 | do | | 300 | 275 | 30 | Do. |
| 5 | do | 1 | 14.0 | 1.4 | CaO | 1.88 | 230 | 240 | 120 | 15.9 |
| 6 | do | 1 | 15.9 | 1.3 | do | 1.87 | 192 | 250 | 90 | 15.5 |
| 7 | do | 1 | 14.3 | 1.4 | $CaCl_2$ | 2.2 | 340 | 260 | 60 | 35.1 |
| 8 | do | 1 | 15.4 | 1.4 | CaO | 1.88 | 218 | 260 | 60 | 31.7 |
| 9 | do | 1 | 14.3 | 1.3 | $CaC_2$ | 2.2 | 340 | 275 | 30 | 46.1 |
| 10 | do | 1 | 14.3 | 1.4 | $CaCl_2$ | 0.25 | 340 | 275 | 30 | 8.25 |
| 11 | do | 1 | 14.3 | 1.4 | do | 0.5 | 340 | 275 | 30 | 30.9 |
| 12 | do | 1 | 14.3 | 1.4 | do | 1.0 | 340 | 275 | 30 | 38.2 |
| 13 | do | 1 | 14.3 | 1.4 | do | 1.5 | 340 | 275 | 30 | 46.4 |
| 14 | do | 1 | 14.3 | 1.4 | do | 2.0 | 340 | 275 | 30 | 43.3 |
| 15 | do | 1 | 14.3 | 1.4 | do | 3.0 | 340 | 275 | 30 | 41.3 |
| 16 | do | 1 | 14.3 | 1.4 | do | 6.0 | 340 | 275 | 30 | 28.9 |
| 17 | do | 1 | 14.3 | 1.4 | $SnCl_2 \cdot 2H_2O$ | 0.5 | 300 | 275 | 30 | 32.0 |
| 18 | do | 1 | 14.3 | 1.4 | do | 1.5 | 300 | 275 | 30 | 44.4 |
| 19 | do | 1 | 14.3 | 1.4 | do | 3.0 | 300 | 275 | 30 | 41.2 |
| 20 | do | 1 | 14.3 | 1.4 | do | 5.0 | 300 | 275 | 30 | 32.0 |
| 21 | do | 1 | 14.3 | 1.3 | $SnCl_2$ | 2.44 | 340 | 300 | 15 | 39.2 |
| 22 | do | 1 | 14.3 | 1.3 | do | 2.44 | 340 | 325 | 1 | 20.6 |

| Run No. | Starting materials | | | | | | Reaction conditions | | | Per cent yield of indole |
|---|---|---|---|---|---|---|---|---|---|---|
| | Reactant | | Alkalies | | Catalyst | | $H_2O$ moles | Temp., °C. | Time, minutes | |
| | Kind | Moles | NaOH moles | KOH moles | Kind | Moles | | | | |
| 23 | ...do... | 1 | 14.3 | 1.3 | $SnCl_4.5H_2O$ | 2.44 | 298 | 260 | 45 | 22.7 |
| 24 | ...do... | 1 | 14.3 | 1.3 | $SnO_2$ | 2.44 | 298 | 260 | 60 | 19.6 |
| 25 | ...do... | 1 | 15.7 | 1.3 | $FeSO_4.7H_2O$ | 1.68 | 324 | 260 | 60 | 34.6 |
| 26 | ...do... | 1 | 14.3 | 1.4 | $FeCl_2.4H_2O$ | 3.00 | 298 | 275 | 30 | 27.9 |
| 27 | ...do... | 1 | 14.3 | 1.3 | $FeCl_3.6H_2O$ | 1.83 | 340 | 260 | 45 | 17.1 |
| 28 | ...do... | 1 | 15.7 | 1.3 | $BaCl_2.2H_2O$ | 1.91 | 324 | 260 | 45 | 22.7 |
| 29 | ...do... | 1 | 15.7 | 1.3 | $Mg(-O_2C-CH_3)_2$ | 2.09 | 324 | 260 | 60 | 25.7 |
| 30 | ...do... | 1 | 15.7 | 1.4 | $ZnSO_4.7H_2O$ | 1.71 | 340 | 260 | 45 | 18.5 |
| 31 | ...do... | 1 | 14.3 | 1.3 | $SrCl_2$ | 2.44 | 340 | 260 | 30 | 17.5 |
| 32 | ...do... | 1 | 14.3 | 1.3 | $Ti(C_2O_4K)_2.2H_2O$ | 1.61 | 300 | 260 | 30 | 20.6 |
| 33 | ...do... | 1 | 15.7 | 1.3 | $Cr(OH)_3$ | 2.44 | 300 | 260 | 30 | 22.6 |
| 34 | ...do... | 1 | 15.7 | 1.4 | $MnCl_2.4H_2O$ | 1.85 | 340 | 260 | 30 | 23.7 |
| 35 | ...do... | 1 | 15.7 | 1.4 | $NiCl_2.6H_2O$ | 1.22 | 340 | 260 | 45 | 14.4 |
| 36 | ...do... | 1 | 14.3 | 1.3 | $ZnCl_2$ / $SnCl_2$ | 2.44 / 0.24 | 340 | 275 | 30 | 35 |
| 37 | ...do... | 1 | 14.3 | 1.3 | $CaCl_2$ / $SnCl_2$ | 1.5 / 1.0 | 340 | 275 | 30 | 38.2 |
| 38 | ...do... | 1 | 14.3 | 1.3 | $CaCl_2$ / $FeCl_2.4H_2O$ | 1.5 / 1.0 | 340 | 275 | 30 | 37.2 |
| 39 | Ethyl Indoxylate | 1 | 21.1 | None | $CaCl_2$ | 2.0 | 278 | 260 | 60 | 14.3 |

In the foregoing table, runs 1-4 demonstrate that indole is obtainable only in very low yield by heating an aqueous solution of indoxyl and alkali metal hydroxides in the absence of other metal compounds. Runs 5-9 demonstrate that calcium compounds promote the reaction to form indole and that the yield becomes greater as the reaction temperature is raised from 240° C. to 275° C. Runs 10-16 show that the effectiveness of calcium compounds as catalysts for the reaction is dependent on the proportion of such compounds in the reaction mixture and that the yield of indole is reduced as the molecular ratio of the calcium compound to the indoxyl reactant is decreased below 0.5 or is increased above 3. Runs 17-20 show that stannous compounds are excellent catalysts, but that their effectiveness also is dependent upon the proportion of such compounds used. Runs 21-22 demonstrate that the catalytic reaction may satisfactorily be carried out at temperatures as high as 325° C. Runs 23-35 demonstrate the effectiveness of a number of other metal compounds in catalyzing the formation of indole. Runs 36-38 show the use of mixtures of such catalytically active metal compounds in the reaction. Run 39 shows the production of indole in accordance with the invention using ethyl indoxylate, instead of indoxyl, as the organic reactant. As hereinbefore mentioned, the ethyl indoxylate apparently first decomposes to form indoxyl which then reacts to form the indole.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making indole wherein an aqueous solution of indoxyl and at least one alkali metal hydroxide is heated to a reaction temperature in a closed container, the step of carrying the reaction out in the presence of at least one ionizable compound of a metal selected from the class consisting of the metals in groups II and IV, series 3-8, and groups VI, VII, and VIII, series 4, of the periodic table, said ionizable metal compound being employed in such proportion as to contain between 0.25 and 6 gram atomic weights of its metal constituent per gram molecular weight of the indoxyl.

2. In a method of making indole wherein an aqueous solution of indoxyl and alkali metal hydroxide is heated to a reaction temperature in a closed container, the step of carrying the reaction out in the presence of at least one ionizable compound of a metal selected from the class consisting of the metals in groups II and IV, series 3-8, and groups VI, VII, and VIII, series 4, of the periodic table, said ionizable metal compound being employed in such proportion as to contain between 0.25 and 5 gram atomic weights of its metal constituent per gram molecular weight of the indoxyl.

3. In a method of making indole wherein an alkaline aqueous solution of indoxyl and at least one alkali metal hydroxide is heated to a reaction temperature in a closed container, the step of carrying the reaction out at a temperature between 250° and 325° C. in the presence of at least one ionizable compound of a metal selected from the class consisting of the metals in groups II and IV, series 3-8, and groups VI, VII, and VIII, series 4, of the periodic table, said ionizable metal compound being employed in such proportion as to contain between 0.25 and 6 gram atomic weights of its metal constituent per gram molecular weight of the indoxyl.

4. In a method of making indole wherein an alkaline aqueous solutin of indoxyl and at least one alkali metal hydroxide is heated to a reaction temperature in a closed container, the step of carrying the reaction out in the presence of at least one ionizable compound of a metal selected from the class consisting of the metals in groups II and IV, series 3-8, and groups VI, VII, and VIII, series 4, of the periodic table, said ionizable metal compound being employed in such proportion as to contain between 0.25 and 5 gram atomic weights of its metal constituent per gram molecular weight of the indoxyl.

5. In a method of making indole wherein an alkaline aqueous solution of indoxyl and at least one alkali metal hydroxide is heated to a reaction temperature in a closed container, the step of carrying the reaction out in the presence of at least one ionizable compound of a metal selected from the class consisting of the metals in groups II and IV, series 3-8, and groups VI, VII and VIII, series 4, of the periodic table, said ionizable compound being employed in such proportion as to contain between 0.5 and 3 gram atomic weights of its metal constituent per gram molecular weight of the indoxyl.

6. In a method of making indole wherein an aqueous solution of indoxyl and at least one alkali metal hydroxide is heated to a reaction temperature in a closed container, the step of carrying the reaction out at a temperature between about 260° and about 280° C. in the presence of at least one ionizable compound of a metal selected from the class consisting of the metals in groups II and IV, series 3-8, and groups VI, VII, and VIII, series 4, of the periodic table, said ionizable compound being employed in such proportion as to contain between 0.5 and 3 gram atomic weights of its metal constituent per gram molecular weight of the indoxyl.

7. In a method of making indole wherein an aqueous solution of indoxyl and at least one alkali metal hydroxide is heated to a reaction temperature in a closed container, the steps of carrying the reaction out at a temperature between about 260° and about 280° C. in the presence of at least one ionizable compound of a metal selected from the class consisting of the metals in groups II and IV, series 3-8, and groups VI, VII, and VIII, series 4, of the periodic table, said ionizable compound being employed in such proportion as to contain between 0.5 and 3 gram atomic weights of its metal constituent per gram molecular weight of the indoxyl, and thereafter separating the indole product.

8. In a method of making indole wherein an alkaline aqueous solution of indoxyl and at least one alkali metal hydroxide is heated to a reaction temperature in a closed container, the step of carrying the reaction out in the presence of an ionizable calcium compound in amount such that the mixture contains between 0.25 and 6 gram atomic weights of chemically combined calcium per gram molecular weight of the indoxyl.

9. In a method of making indole wherein an alkaline aqueous solution of indoxyl and at least one alkali metal hydroxide is heated to a reaction temperature in a closed container, the step of carrying the reaction out at a temperature between 250° and 325° C. in the presence of sufficient ionizable calcium compound so that the mixture contains between 0.25 and 5 gram atomic weights of chemically combined calcium per gram molecular weight of the indoxyl.

10. In a method of making indole wherein an alkaline aqueous solution of indoxyl and at least one alkali metal hydroxide is heated to a reaction temperature in a closed container, the steps which consist in carrying the reaction out at a temperature between about 260° and about 280° C. in the presence of sufficient ionizable calcium compound so that the mixture contains between 0.5 and 3 gram atomic weights of chemically combined calcium per gram molecular weight of indoxyl, and thereafter separating the indole product.

11. In a method of making indole wherein an alkaline aqueous solution of indoxyl and at least one alkali metal hydroxide is heated to a reaction temperature in a closed container, the step of carrying the reaction out in the presence of sufficient ionizable tin compound so that the mixture contains between 0.25 and 6 gram atomic weights of chemically combined tin per gram molecular weight of the indoxyl.

12. In a method of making indole wherein an alkaline aqueous solution of indoxyl and at least one alkali metal hydroxide is heated to a reaction temperature in a closed container, the step of carrying the reaction out at a temperature between 250° and 325° C. in the presence of sufficient ionizable tin compound so that the mixture contains between 0.5 and 3 gram atomic weights of chemically combined tin per gram molecular weight of the indoxyl.

13. In a method of making indole wherein an alkaline aqueous solution of indoxyl and at least one alkali metal hydroxide is heated to a reaction temperature in a closed container, the steps which consist in carrying the reaction out at a temperature between about 260° and about 300° C. in the presence of sufficient ionizable stannous compound so that the mixture contains between 0.5 and 3 gram atomic weights of chemically combined tin per gram molecular weight of the indoxyl reactant, and thereafter separating the indole product.

14. In a method of making indole wherein an alkaline aqueous solution of indoxyl and at least one alkali metal hydroxide is heated to a reaction temperature in a closed container, the step of carrying the reaction out in the presence of sufficient ionizable iron compound so that the mixture contains between 0.25 and 6 gram atomic weights of chemically combined iron per gram molecular weight of the indoxyl.

15. In a method of making indole wherein an alkaline aqueous solution of indoxyl and at least one alkali metal hydroxide is heated to a reaction temperature in a closed container, the step of carrying the reaction out at a temperature between 250° and 300° C. in the presence of sufficient ionizable iron compound so that the mixture contains between 0.5 and 3 gram atomic weights of chemically combined iron per gram molecular weight of the indoxyl.

16. In a method of making indole wherein an alkaline aqueous solution of indoxyl and at least one alkali metal hydroxide is heated to a reaction temperature in a closed container, the steps which consist in carrying the reaction out at a temperature between about 260° and about 300° C. in the presence of sufficient ionizable ferrous compound so that the mixture contains between 0.5 and 3 gram atomic weights of chemically combined iron per gram molecular weight of the indoxyl reactant, and thereafter separating the indole product.

17. In a method of making indole, the steps which consist in forming an alkaline aqueous mixture comprising indoxyl and sufficient alkali metal hydroxide to cause dissolving of the same and an ionizable compound of a metal selected from the class consisting of the metals in groups II and IV, series 3-8, and groups VI, VII, and VIII, series 4, of the periodic table, said ionizable metal compound being present in a proportion such as to contain between 0.25 and 5 gram atomic weights of its metal constituent per gram molecular weight of the indoxyl, heating the mixture at superatmospheric pressure to a reaction temperature between about 250° and about 325° C., and thereafter separating indole from the reacted mixture.

18. In a method of making indole, the steps which consist in forming an alkaline aqueous solution of indoxyl and an alkali metal hydroxide, adding an ionizable compound of at least one metal selected from the class consisting of the metals in groups II and IV, series 3-8, and groups VI, VII, and VIII, series 4, of the periodic table, in amount such that the mixture contains between 0.25 and 5 gram atomic weights of the metal constituent of said ionizable metal compound per gram molecular weight of indoxyl, heating the mixture at superatmospheric pressure to a reaction temperature between about 250° and about 300° C., and thereafter separating indole from the reacted mixture.

19. In a method of making indole, the steps which consist in forming an alkaline aqueous solution of indoxyl and an alkali metal hydroxide, adding a calcium compound in amount such that the mixture contains between 0.25 and 6 gram atomic weights of chemically combined calcium per gram molecular weight of indoxyl, heating the mixture at superatmospheric pressure to a reaction temperature between about 250° and about 300° C., and thereafter separating indole from the reacted mixture.

20. In a method of making indole, the steps which consist in forming an alkaline aqueous solution of indoxyl and an alkali metal hydroxide, adding lime in amount such that the mixture contains between about 0.5 and about 3 gram atomic weights of chemically combined calcium per gram molecular weight of indoxyl, heating the mixture at superatmospheric pressure to a reaction temperature between about 260° and about 280° C., and thereafter separating indole from the reacted mixture.

JOHN E. LIVAK.